United States Patent [19]
Zoraster

[11] Patent Number: 5,839,090
[45] Date of Patent: Nov. 17, 1998

[54] TRENDFORM GRIDDING METHOD USING DISTANCE

[75] Inventor: Steven Zoraster, Austin, Tex.

[73] Assignee: Landmark Graphics Corporation, Houston, Tex.

[21] Appl. No.: 749,145

[22] Filed: Nov. 14, 1996

Related U.S. Application Data

[60] Provisional application No. 60/007,508, Nov. 22, 1995.

[51] Int. Cl.$^6$ ...................................................... G06F 19/00
[52] U.S. Cl. .................................................................. 702/5
[58] Field of Search ............................... 702/5; 434/150, 434/152, 153

[56] References Cited

U.S. PATENT DOCUMENTS

| | | |
|---|---|---|
| 5,034,992 | 7/1991 | Kumagai . |
| 5,390,291 | 2/1995 | Ohashi . |
| 5,394,325 | 2/1995 | Schneider, Jr. . |
| 5,568,384 | 10/1996 | Robb et al. . |

OTHER PUBLICATIONS

"The Euclidean Distance Trasnform in Arbitrary Dimensions," by Ragnemalm, Image Processing and Its Applications (IEEE Conference Publication 354, 1992, pp. 290–293.
"Grid Data Generation From Contour Images by Using Euclid Distance Trasnformation," by Lee, Fukue, Shimoda, and Sakata, Remote Sensing for the Nineties, 1993, (IGARSS), pp. 1727–1729.
"Partial Shape Classification Using Contour Matching in Distance Transformation," by Liu and Srinath, IEEE 1990, vol. 12, No. 11, pp. 1072–1078.
The Euclidean Distance Transform in Arbitrary Dimensions, by Ingemar Ragnemalm Pattern Recognition Letters, vol. 14, No. 11, Nov. 1993, pp. 883–888.
Distance Transformations in Arbitrary Dimensions, by Gunilla Borgefors, Computer Vision, Graphics, and Image Processing 27, 1984, pp. 321–345 and 371.
Distance Transformations in Digital Images, by Gunilla Borgefors, Computer Vision, Graphics, and Image Processing 34, 1986, pp. 344–371.
Least–cost Path in GIS Using an Accumulated Cost Surface and Slopelines, by David H. Douglas, Cartographica, vol. 31, No. 3, Autumn 1994, pp. 37–51.
Conditional Curvilinear Stochastic Simulation Using Pixel–based Algorithms, by Xu and Journel, Stanford Center for Reservoir Forecasting, pp. 1–46.
Modeling Anisotropy in Computer Mapping of Geologic Data, by Kushnir and Yarus, Computer Modeling of Geologic Surfaces and Volumes, AAPG Computer Applications in Geology, No. 1, Chapter 7, pp. 75–91.
The Shape–Assist Technique: Incorporating Stream Channel Interpretations into Computer–Generated Surface Models: Clark County, Kansas, by Fierstien and Brewster, Computer Modeling of Geologic Surfaces and Volumes, AAPG Computer Application in Geology, No. 1, Chapter 3, pp. 27–35.
Contouring Geologic Surfaces With the Computer, by Jones, Hamilton & Johnson, Van Nostrand Reinhold, New York, p. 48.
Improving Cost–Path Tracing A Rasstez Data Format, by Xu and Lathrop Jr., Computers & Geosciences, vol. 20, No Pergamon, 1994, pp. 1455–1465.
An Algorithmic Approach to Some Problems in Terrain Navigation, by Joseph S.B. Mitchell, Artificial Intelligence, vol. 37, Nos. 1–3, Dec. 1988, pp. 171–201.
Statistics and Data Analysis in Geology, by John C. Davis, Second Edition, John Wiley & Sons, pp. 365–380.
Linear Time Euclidean Distance Transform Algorithms, by Breu, Gil, Kirkpatrick, and Werman, IEEE Transactions on Pattern Analysis and Machine Intelligence, vol. 17, No. 5, May 1995, pp. 529–533.

*Primary Examiner*—Donald E. McElheny, Jr.
*Attorney, Agent, or Firm*—Bush, Riddle & Jackson L.L.P.

[57] ABSTRACT

A method for incorporating high quality geologic interpretations onto computer generated contours. The method starts with a trend form grid on which characteristics of geological formations are superimposed. Contours of such characteristics with respect to the trend form grid are generated using a distance transformation.

5 Claims, 7 Drawing Sheets

| 100 | 100 | 100 | 100 | 100 | 100 | 100 |
|---|---|---|---|---|---|---|
| 100 | 100 | 100 | 100 | 100 | 100 | 100 |
| 100 | 100 | 100 | 0.0 | 100 | 100 | 100 |
| 100 | 100 | 100 | 100 | 100 | 100 | 100 |
| 100 | 100 | 100 | 100 | 100 | 100 | 100 |
| 100 | 100 | 100 | 100 | 0.0 | 100 | 100 |
| 100 | 100 | 100 | 100 | 100 | 100 | 100 |

| 3.69 | 2.74 | 2.32 | 1.91 | 2.32 | 2.74 | 3.69 |
|---|---|---|---|---|---|---|
| 3.28 | 2.32 | 1.37 | 0.96 | 1.37 | 2.32 | 3.28 |
| 2.87 | 1.91 | 0.96 | 0.00 | 0.96 | 1.91 | 2.87 |
| 3.28 | 2.32 | 1.37 | 0.96 | 1.37 | 2.32 | 2.74 |
| 3.69 | 2.74 | 2.32 | 1.37 | 0.96 | 1.37 | 2.32 |
| 3.82 | 2.87 | 1.91 | 0.96 | 0.00 | 0.96 | 1.91 |
| 4.23 | 3.28 | 2.32 | 1.37 | 0.96 | 1.37 | 2.32 |

TRENDFORM GRIDDING METHOD USING DISTANCE

This application claims the benefit of U.S. Provisional Application No. 60/007,508 filing date Nov. 22, 1995.

BACKGROUND OF THE INVENTION

1. Field of the Invention

This invention relates generally to a new method for incorporating high quality geologic interpretations into contouring programs. More specifically, this invention relates to a method of constructing digital, grid-based models of the earth covering two or three dimensional space.

Other fields of use for this invention include any scientific field which requires the generation of two dimensional or three dimensional grid-based computer models from data which is not already gridded. Possible fields of application include weather forecasting, atmospheric studies, oceanography, medical imaging and biomedical modeling. The principals of Trendform Gridding can be used directly in those fields as it is used in the embodiment described herewith.

2. Description of the Prior Art
A. Distance Transformations

Distance transformation methods have been used for over fifteen years in the computer science fields of image processing and robotics. The prior art illustrates a 2-dimensional raster image including pixels which correspond to features and pixels which do not correspond. For convenience, the feature pixels are assigned a value of 0, and the non-feature pixels are assigned a very large number. A distance transformation converts this image into an image where all non-feature pixels are assigned the distance to the closest feature pixel, according to some method or "metric". Metrics vary between applications. Standard metrics include the Manhattan metric, the Euclidean metric and approximations to the Euclidean metric. FIGS. 2a and 2b show a prior method where an approximate Euclidean distance transformation is applied to a small image with two embedded feature pixels. FIG. 2a shows an image prior to transformation with two embedded feature pixels represented by 0's. All non-feature pixels are initialized with the value 100. FIG. 2b shows all of the non-feature pixels having distance values rounded to the second decimal.

Computing the exact Euclidean distance transformation at each non-feature pixel on a large image is computationally expensive. At each pixel a search for the closest feature pixel is required. Computationally less expensive distance transformations approximate the Euclidean metric by passing a local pixel operator over an image twice. The first pass, the forward pass, is from left to right and top to bottom. On the second pass, the backward pass, a mirror image of the first pass operator is moved over the image from right to left and from bottom to top.

The accuracy of the distance transformation produced by local operations is dependent on the number of pixels in the operator mask and the complexity of the calculations performed at each pixel. FIGS. 3a and 3b show a five pixel distance transformation mask proposed by P. E. Danielsson in a publication, 1980, *Euclidean Distance Mapping*, Computer Graphics and Image Processing, Vol. 14., pp. 227–248. In both figures the target pixel is labeled d (0,0), which represents the current estimate of the distance transformation value for that pixel. Similarly, d(−1,1), d(0,1), d(1,1) and d(−1,0) represent current estimates of the distance transformation values for four neighboring pixels at the offset vectors indicated by the subscripts. On the forward pass (FIG. 3a), which moves from left to right and from top to bottom (indicated by the arrows), when the operator is moved to a new target pixel, the value stored at d(0,0) is replaced by:

$$\min\ ((d(0,0),\ d(-1,1)+C(-1,1),\ d(0,1)+C(0,1),\ d(1,1),+C(1,1),\ d(-1,0)+C(-1,0))),$$

where C(i,j) is an application specific approximation of the distance from d(i,j) to d(0,0). On the backward pass a symmetric operator is applied and the value stored at d(0,0) is replaced by:

$$\min\ (d(0,0),\ d(-1,-1)+C(-1,-1),\ d(0,-1)+C(0,-1),\ d(1,-1)+C(1,-1),\ d(1,0)+C(1,0)).$$

Different values have been proposed for C(i,j) depending on the distance metric used and whether distances can be approximated using integers. Borgefors in a publication, 1986, *Distance Transformation in Digital Images*, Computer Vision, Graphics and Image Processing, Vol. 34, pp. 344–378, showed that by using real numbers for distances, the maximum error in the final image is minimized by using the following values of C(i,j):

$$C(-1,0)=C(1,0)=C(0,1)=C(0,-1)=0.95509,\ \text{and}$$

$$C(1,1)=C(-1,-1)=C(1,-1)=C(-1,1)=1.36930.$$

With these values, the maximum deviation between approximate distance transformation values and the true Euclidean distance is always less than 5%. In the remainder of this specification all references to the use of distance transformations will mean the use of the 5 pixel masks shown in FIGS. 3a and 3b and the Borgefors' C(i,j) values, unless the use of other values are specifically discussed.

Once a distance transformation has been performed, it is possible to determine the feature pixel nearest to any non-feature pixel. The closest feature pixel is obtained by a recursive method. For example, starting with a pixel for which the nearest feature is needed, values of i and j are picked which minimize $$\min\ (C(i,j)+D(i,j)).$$

That neighbor pixel becomes the new target pixel. This recursive process must terminate at a feature pixel, which is the feature pixel closest to the non-feature pixel in question—give or take a 5% error tolerance. The backtracking method not only identifies the nearest non-feature pixel, but also finds the pixel-based path to follow to get to that feature.

B. Distance Transformations in Terrain Navigation

Distance transformations have been applied in fields outside image processing and robotics including pattern recognition and terrain navigation. K. L. Clarkson described such an application in 1987 in a paper *Approximation Algorithms for Shortest Path Motion Planning*, Proc. 19 Ann. ACM Symp Theory Computers, pp. 56–65. Distance transformations have been adapted to select paths for vehicles, people, or robots around obstacles. They have also been used for navigation or path planning over terrain. In terrain navigation applications the terrain is divided in non-overlapping regions. Each region has a cost for movement through it. J. S. B. Mitchell describes such technique in a 1988 paper, *An Algorithmic Approach to Solve Problems in Terrain Navigation,* Artificial Intelligence, Vol. 37, pp. 171–201. To apply distance transformations to the terrain navigation problem requires only a small amount of added complexity. First, the C(i,j)'s become general cost factors such as time, instead of distance. Second, the values of the C(i,j) are made a function of the terrain at the operator position. Pixels which are difficult to travel through have large costs associated with them. In a simple navigation problem the pixel costs might be proportional to the slope of the terrain. In a military application, open terrain subject to enemy observation might have an additional cost factor associated with it.

With spatially varying movement costs, more than one forward and one backward pass of a local distance transformation operator is required to achieve convergence of values at all non-feature pixels. But once convergence is obtained it is still possible to trace optimal paths back to a starting feature using the recursive technique described above. However, in this case the optimal paths may be convoluted, bending to avoid regions with, large C(i, j), or to pass through regions with particularly low C(i, j).

C. Distance Transformation in Raster-Based Geographical Information Systems

Distance transformations have also been incorporated in raster-based Geographical Information Systems (GIS) where they are used under the name of least cost or minimal cost path planning. Two papers have been published which describe such use. The first by D. H. Douglas, 1994, *Least-Cost Path in GIS Using An Accumulated Cost Surface and Slopelines,* Cartographica, Vol. 31, No. 3, pp. 37–51. The second is by J. Xu and R. G. Lanthrop, 1994, *Improving Cost-Path Tracing in a Roster Data Format,* Computers and Geosciences, Vol. 20, No. 10, pp. 1455–1465.

D. Moving Weighed Average Gridding Based on the Distance Transformation Paradigm The most straightforward use of distance transformations in computer contouring is an application to a standard gridding program for moving weighted averaging. Such use is described by J. D. Davis in a book, *Statistics and Data Analysis in Geology,* 1986, John Wiley & Sons, New York. Such program interpolates z-values at grid nodes by averaging a local sample of the input data. Most moving weighted averaging programs are "grid node-based". At each node a search is limited to data values within a user specified search radius of the grid node. To obtain a good sample of data searches are often performed in "search octants" around the grid node, and an attempt is made to pick at least one nearby data point in each octant. FIG. 4 shows such prior art data search strategy, which is discussed in more detail in a book by T. A. Jones, et al., *Contouring Geologic Surface with the Computer,* 1986, Van Nostrand Reinhold, New York. The current target grid node is at the center of the search circle. The radius of the circle is the user specified distance to search for data. There are three octants with 2 data values in them and two octants with 1 data value. Three octants have 0 data in them. After data is collected, the node value is computed by the formula, $$z = \frac{\Sigma \frac{Zi}{(Di)^r}}{\Sigma \frac{1}{(Di)^r}}$$

where the summation is over nearby data values within the search radius, Di is the distance from the grid node to the data value with index i, and the exponent r is a positive number greater than or equal to 1. In most applications r is set equal to 2, and that value is used in the examples below.

Some moving weighted average gridding implementations invert the grid-based implementation and produce a "data-based" method implemented in a computer program. The program is initialized with computer memory allocated to hold two copies of the grid. These grids are called G1 and G2. Both grids are initialized by setting all nodes to 0. For each data point the distance to all grid nodes is determined within a user specified search radius of the data point. At each such node, the sums which make up the numerator in equation (1) are accumulated in G1 and the sums which make up the denominator are accumulated in G2. This process is repeated until all the data is sampled. Then grid G1 is divided by grid G2 on a node by node basis.

Data-based implementations of moving weighted average gridding can be created easily using a distance transformation. For each data value a third grid G3 is initialized with a value of 0 at the node nearest the data point, and large numbers everywhere else. A distance transformation is performed on G3. The grid G3 now has the necessary distances required to update the grids G1 and G2. This step is repeated until all data values have been processed. Again the grid G2 is divided by the grid G1 on a node by node basis.

FIG. 5 shows a contour map as a result of applying distance weighted average gridding of water saturation data using a distance transformation. The data used in this example is from a small artificial data set developed by a geologist to provide realistic tests for new company products, such as new gridding programs. The artificial data includes structure picks for the top of a unit, and water saturation data for the unit. Water saturation contours are shown as color filled contours in shades of gray. Overlaid on the water saturation results are structural contours from the horizon above the unit to which the water saturation values apply. Arrows indicate parts of the map which emphasize the tendency of moving weighted average gridding to produce a rounded feature. Because the map of FIG. 5 is nothing more than a non-standard implementation of moving weighted average gridding, water saturation features shown on the map are rounded.

3. Objects of the Invention

Weighted least squares and moving weighted gridding methods have been used in the computer science fields of GIS and earth modeling for at least 20 years to create mathematical models of a two dimensional surface or a three dimensional volume. Distance transformations under any name have not been used previously in gridding methods.

A major unresolved deficiency in GIS and earth modeling methods has been an inability to implement practical 2D or 3D digital, surface or earth modeling methods which honor local or continuously varying biases or anisotropy. Methods which have previously been suggested for achieving this goal involve complex data partitioning, data or model editing, and/or multiple step methods. These methods are almost never used in practical applications, because they are so complex.

A primary object of the invention is to provide practical 2D or 3D digital, surface or earth modeling methods which honor local or continuously varying biases in anisotropy.

A more fundamental object is to provide a simple, intuitive, and practical method for GIS and earth modeling.

SUMMARY OF THE INVENTION

This invention presents a method, implemented in a contouring program, which uses a new paradigm to provide a robust solution to the problem of imposing geologic interpretations onto contour maps. The new method depends on an image processing method called a "distance transformation".

Computer contouring typically involves a two-step process. In the first step, a digital model is created by interpolation from irregularly spaced data which is provided in the form of $(x_i, y_i, z_i)$ triples. Data z-values are assumed to be a function of x and y. Usually the digital model is a two dimensional array of interpolated z-values called a grid. In the second contouring step contours are traced through the grid-based model. The words "computer contouring" can encompass both phases, or just the first phase. The term "gridding" always means the first phase.

An operation repeated over and over in standard gridding programs is the calculation of Euclidean distance in the (x,y) plane between data values and grid nodes. In those programs, the influence of the each data z-value on the z-value interpolated at a grid node is inversely proportional to the Euclidean distance between that data point and the grid node. According to the invention, distance measurements are distorted through the influence of a user selected "form grid" and a distance transformation method. When the straight line path between a data point and a target grid node is aligned up or down dip in the form grid, distances are exaggerated so that the influence of the data z-value on the grid node z-value is reduced. When the straight line path follows the strike of the form grid, distances are not distorted. In fact, as shown in FIG. 1, distortion of distance measurements is continuous with respect to the form grid, so that the calculated distance from a data point to a grid node may be shorter following a sinuous contour of the form grid, than by using a straight line path. The contours in FIG. 1 represent contours of a form grid. Using a distance transformation, it is possible to distort the calculations of distance up or down dip on the form grid so that the distance AC appears much larger than the distance AB, even through they are actually the same length measured in the x,y plan. Furthermore, distances can be distorted continuously, so that the arc DE is calculated to be shorter than the straight line connecting those two points. As a result, the gridding process is induced to honor the interpretation in the form grid. Modeling the continuous distortion of distances through the use of a distance transformation is an important aspect of the invention.

More specifically the invention is for a method of imposing an interpretation or general shape on a computer-generated, rectangular grid-based digital model of a three dimensional object defined by data which are samples of and characterize that object.

A user creates or defines a rectangular grid-based "form-grid" with dimensions representative of the desired object model. The contours of the form grid represent the desired general shape for the final object model. Next, the local gradient at each node of the form grid is determined.

The "total distance" between every data sample and every grid node of the final object model is determined. Total distances are measured along "minimum weighted length" paths created by connecting adjacent nodes of the form grid. The calculation of path distances is achieved through the use of a "weighted distance transformation," a computer algorithm in general use in the fields of image processing and geographical information systems. According to the invention, the weighted distance transformation is modified such that the calculated "distance" between any adjacent pair of grid nodes is increased by the product of (1) the absolute value of the cosine of the angle of a ray joining such grid pair and the local gradient of the form grid, (2) the magnitude of the local gradient, and (3) a user defined, non-negative real number.

As a result of the use of an "increased" weighted distance transformation and of the calculation of node-to-node distances in the way defined above, the "minimum weighted length" paths along which total distances between data samples and grid nodes are "measured" tend to follow contours of the form grid.

The final calculation of the object value at every grid node using every data value by mathematical techniques widely used in geoscience applications and in geographical information systems. These techniques weight the data values in inverse proportion to the "distance" between the data value and the grid node, and include moving weighted averaging and moving least squares surface fitting. However, unlike traditional applications, in the improved method according to the invention the inverse distances are calculated based on the total (path) distances which follow the form grid, rather than standard Euclidean distances.

BRIEF DESCRIPTION OF THE DRAWINGS

The objects, advantages and features of the invention will become more apparent by reference to the drawings which are appended hereto and wherein like numerals indicate like elements and wherein an illustrative embodiment of the invention is shown, of which.

DESCRIPTION OF THE INVENTION

Figures 1, 2A, 2B:
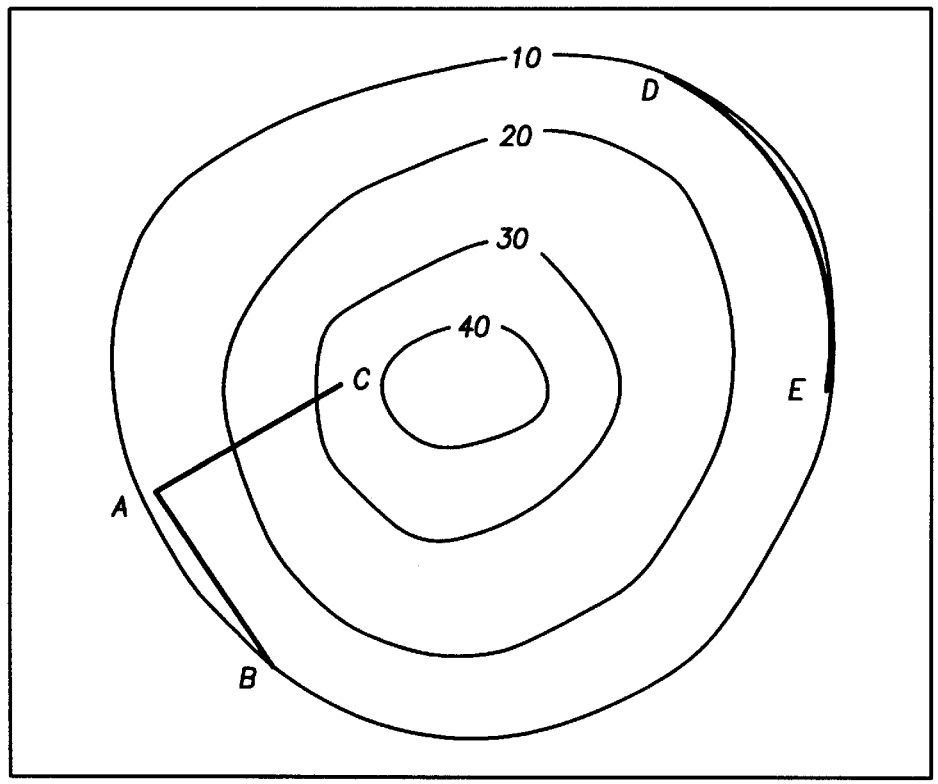
FIG. 1 illustrates contours of a form grid and illustrates the use of a distance transformation, to distort calculations of distance up or down dip on the form grid so that the distance AC appears much larger than the distance AB, even through they actually represent the same length in the x,y plan, the figure further illustrating that distances can be distorted continuously, so that the arc DE is calculated to be shorter than the straight line connecting those two points.
FIGS. 2a and 2b illustrate two prior art views of an image with FIG. 2a showing the image before a distance transformation has been performed, where two embedded features pixels are represented by 0's and all non-feature pixels initialized with the value 100 and with FIG. 2b showing the image with all the non-feature pixels having distance values rounded to the second decimal.
Figure 3A:
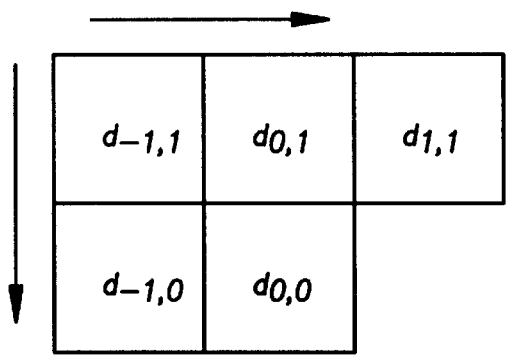
FIGS. 3a and 3b illustrate a prior art five pixel distance transformation mask, with the mask of FIG. 3a provided for the first pass, moving from left to right and from top to bottom of the image or grid, and the mask of FIG. 3b for the second pass, moving for right to left and from bottom to top with the arrows indicating the directions in which the two masks are moved over an image.
Figure 3B:
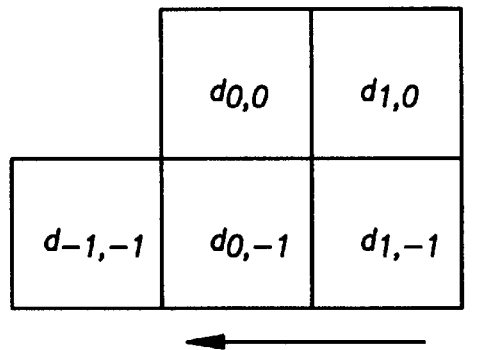
Figure 4:
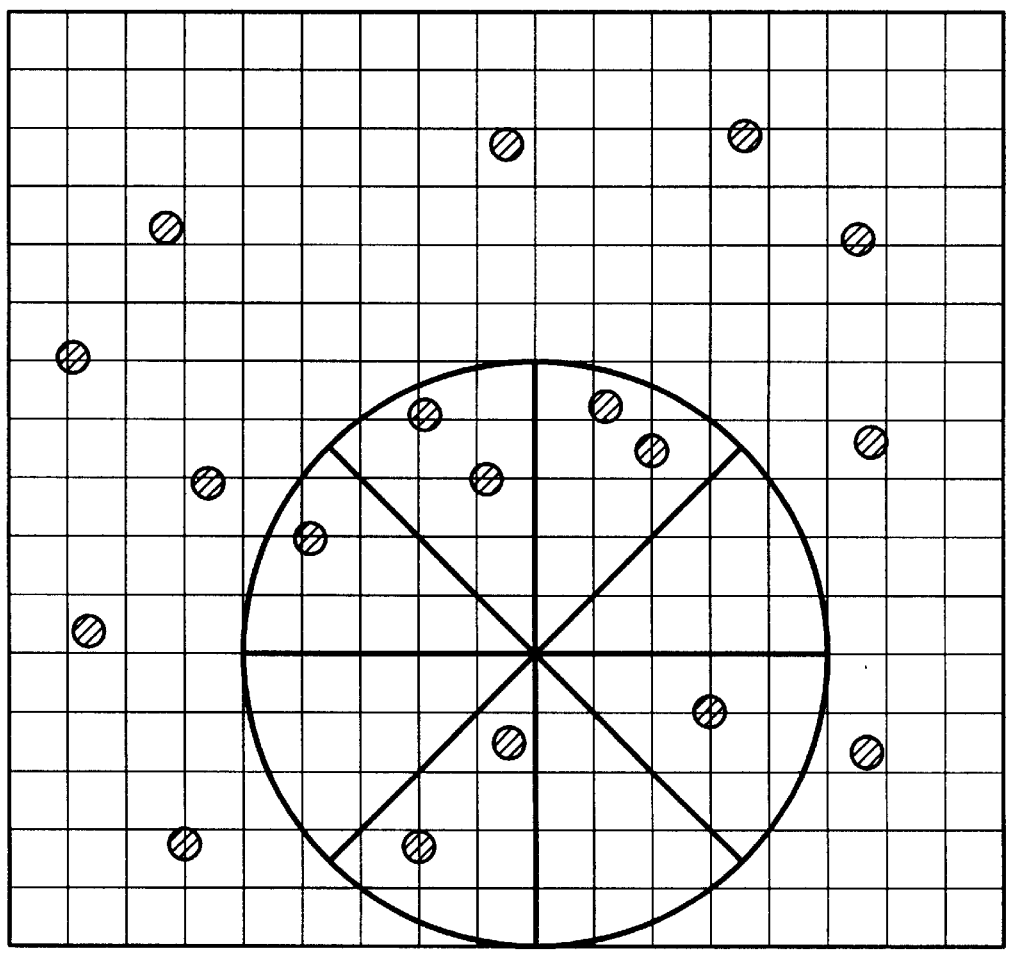
FIG. 4 illustrates prior art octant based data searching where the current target grid node is at the center of the search circle, and the radius of the circle is a user specified distance to search for data.

A. Trend Form Gridding Using Moving Weighed Averaging and Distance Transformations In terrain navigation where distance transformations are used as described above, a reasonable cost factor which may be assigned to a terrain pixel is a cost proportional to the local steepness of the terrain. If enough information is available, the cost will vary depending on whether the pixel is being crossed in the local direction of maximum dip, or along an isoline. In addition, the cost should be larger the steeper the slope being crossed.

Assume that the first derivatives dz/dx and dz/dy are available at each terrain pixel. The magnitude of the gradient at the pixel is $$\text{grad} = \sqrt{\left(d\frac{z}{dx}\right)^2 + \left(d\frac{z}{dy}\right)^2}$$

The normalized dot product of the vector (dz/dx, dz/dy) with the offset vectors (i,j) of each neighboring pixel defined by X $$\frac{d\frac{z}{dx} \cdot i + d\frac{z}{dy} \cdot j}{\text{grad} \cdot \sqrt{i^2 + j^2}},$$

is the cosine of the angle between those two vectors. The magnitude of the normalized dot product is 1 when (dz/dx, dz/dy) points in the same direction (±180 degrees) as an offset vector (i,j), and 0 when (dz/dx, dz/dy) points in a direction 90 degrees away from the offset vector. The closer the direction of the gradient vector to the offset vector, the closer the magnitude of the normalized dot product is to 1.

To impose geologic constraints on moving weighted average gridding, a form grid is provided by the user. The form grid is the source of the gradient and gradient vector information discussed above. The z-values in the form grid are defined so that contouring the form grid produces contours which indicate a generalized version of a geoscientist's interpretation of the local biases which should be applied to the data being gridded. Straightforward methods of providing form grids are discussed below.

The final step to change moving weighted average gridding based on a distance transformation to moving weighted average gridding with geologic constraints is to change each C(i,j) to C*(i,j) by the formula:

$$C^*(i,j) = C(i,j) \cdot (1 + \text{penalty} \cdot |\text{cosine}| \cdot \text{grad})$$

where cosine and grad are derived directly form the form grid, and penalty is a non-negative number supplied by the user as the maximum cost for movements along dip in the form grid. With this definition, the C*(i,j) are always greater than or equal to the old C(i,j).

Performing moving weighted average gridding using distance transformation cost factors derived from a form grid produces results quite different from ordinary moving weighted average gridding. Because of the way C*(i,j) are defined as in equation (4), distances are distorted. Movements up or down dip in the form grid are penalized, with the calculated distances being larger than they really are. However, distances from a data point measured along a contour of the form grid approximate their true Euclidean distance measured along that contour.

Figure 5:
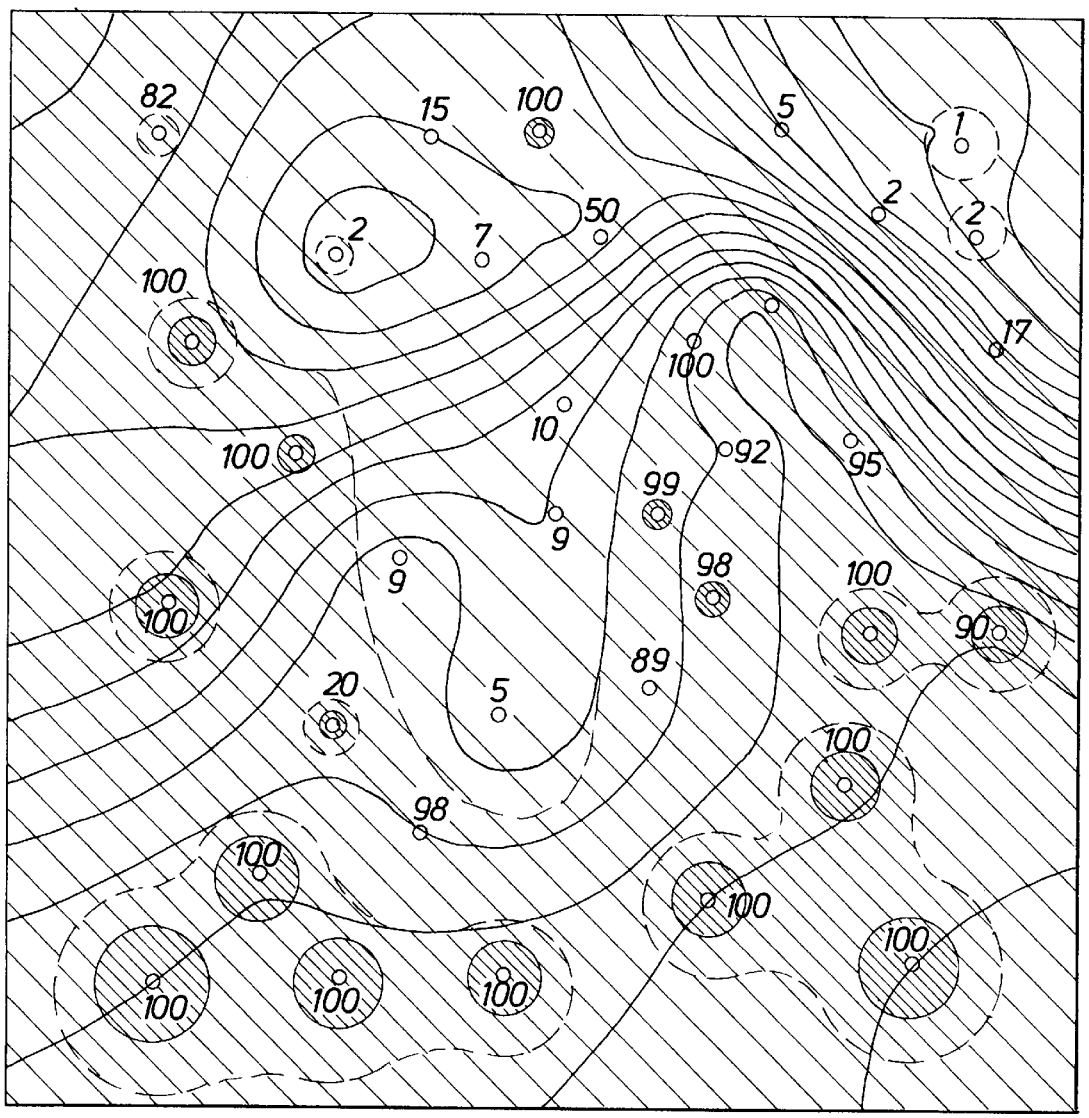
FIG. 5 shows a contour map resulting from a prior art method of moving weighted average gridding of water saturation data, where the water saturation contours are shown as shades of gray which are overlaid by structural contours from the horizon above the unit to which the water saturation values apply, and where arrows indicate parts of the map which emphasize the tendency of moving weighted average gridding to produce rounded features.
Figure 6:
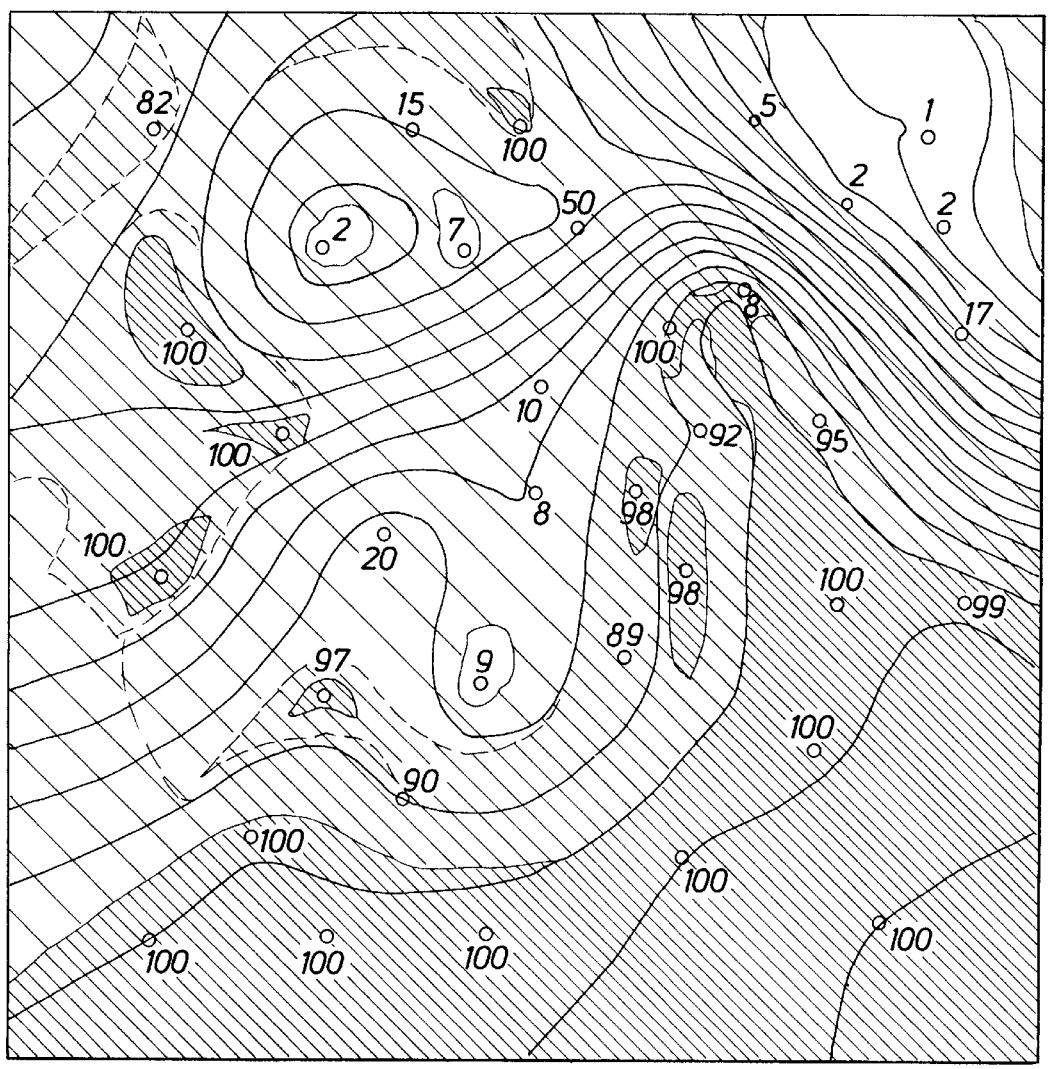
FIG. 6 shows a contour map of the same water saturation data shown in FIG. 5, but in using the methods of this invention the water saturation has been gridded to honor the form of the overlaid structure contours, where arrows indicate where honoring the structure grid contours has elongated water saturation features.

FIG. 6 is a map showing the use of a form grid to contour the same water saturation data contouring in FIG. 5, but through the use of this invention the water saturation has been gridded to honor the form of the overlaid structure contours. Arrows indicate where honoring the structure grid contours has elongated water saturation features. Again the water saturation results are shown by gray scale filled contours. The form grid is simply the structure grid which is the source of the contour lines overlaid on the maps in both FIGS. 5 and 6. Comparing the two maps of FIGS. 5 and 6 shows that the water saturation contours have been biased in the map of FIG. 6 to follow the local shape of the structure contours.

An analysis of equation (4) used to create the problem specific C(i,j) is straight forward. First, if the user sets the maximum penalty to 0, then the method reverts to an ordinary moving weighted average gridding method independent of the shape of the form grid. Second, if the form grid is generally flat, then the gradient magnitude will be close to zero everywhere, and again the method will revert to moving weighted average gridding. Finally, if the form grid has a constant slope in one direction, distances will be exaggerated in the direction of slope and all the contours will be biased in a perpendicular direction to the slope of the form grid.

B. Generation Form Grids

According to this method this invention, the user must define a form grid to use the method as described above. An example is shown in FIG. 6, where the form grid is simply a structure grid. In this case it is the structure of the horizon on top of the unit in which the water saturation values are calculated. A form grid typically is readily available as part of normal mapping work flows.

Figure 7:
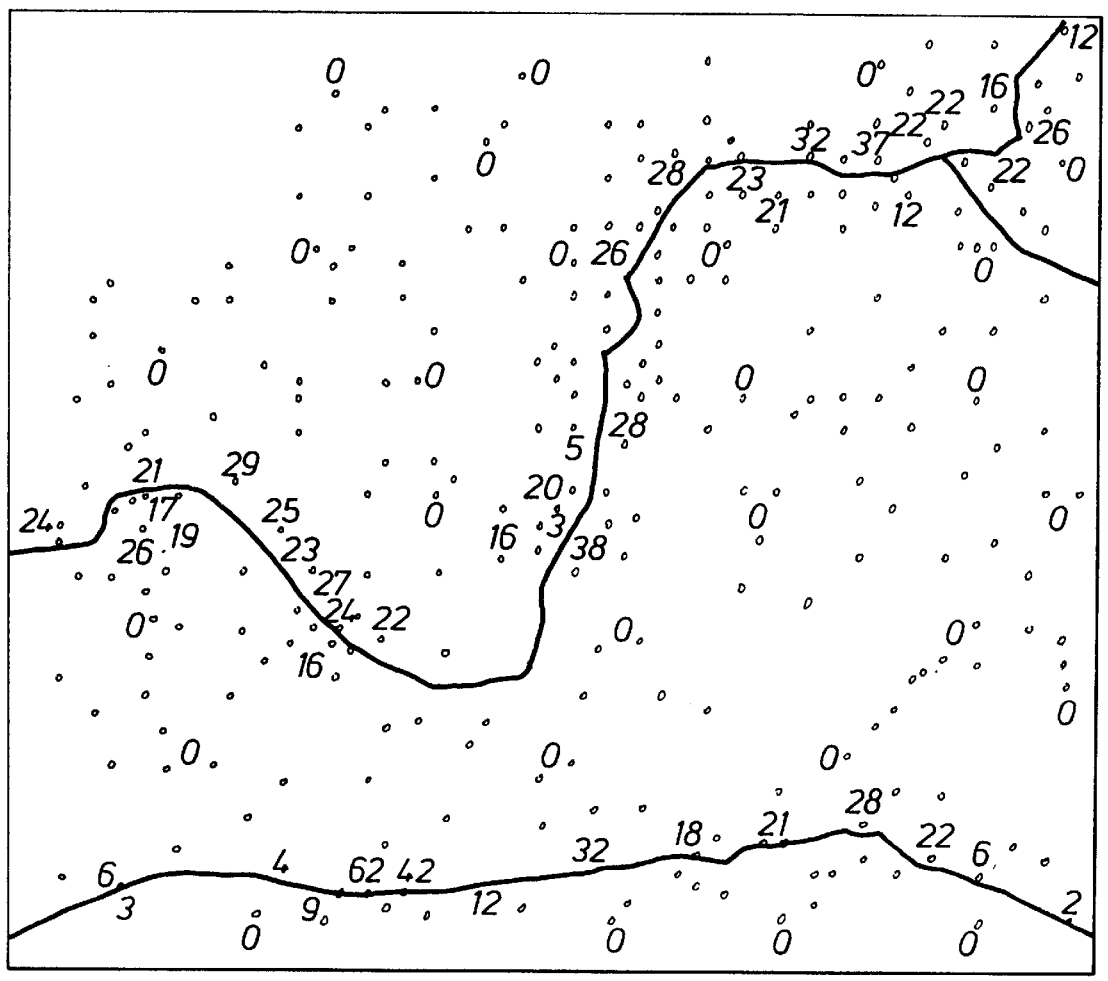
FIG. 7 illustrates stream channel sand thickness data showing digitized user interpretations of the channel centerlines.

FIG. 7 illustrates another way to produce form grids. This data of FIG. 7 represents sand thickness in fluvial deltaic stream channels in the Red Form Sandstone of Oklahoma. Positive data values are measured channel thicknesses, and 0 values indicate wells where the channel sands were not detected. This data is available in Appendix A of a book by Hamilton and Jones, 1992, *Computer Modeling of Geologic Surfaces and Volcanoes,* American Association of Petroleum Geologists, Tulsa. Overlaid on the data are three polylines representing a geoscientist's interpretation of centerlines for the stream channels. These center lines are the ultimate source of the form grid for this data.

Figure 8:
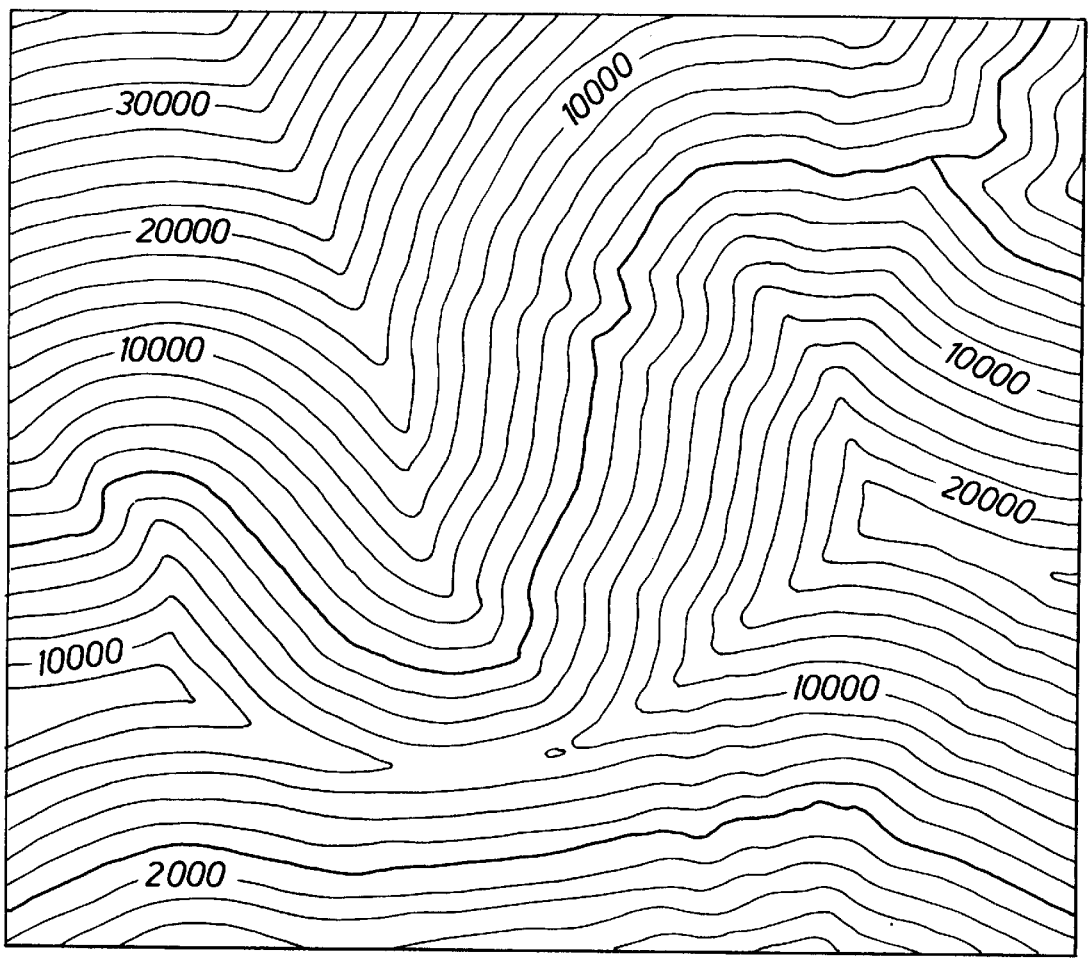
FIG. 8 illustrates contours of distance from digitized stream channel centerlines where the underlying distance grid is used as a form grid for the data in FIG. 7.
Figure 9:
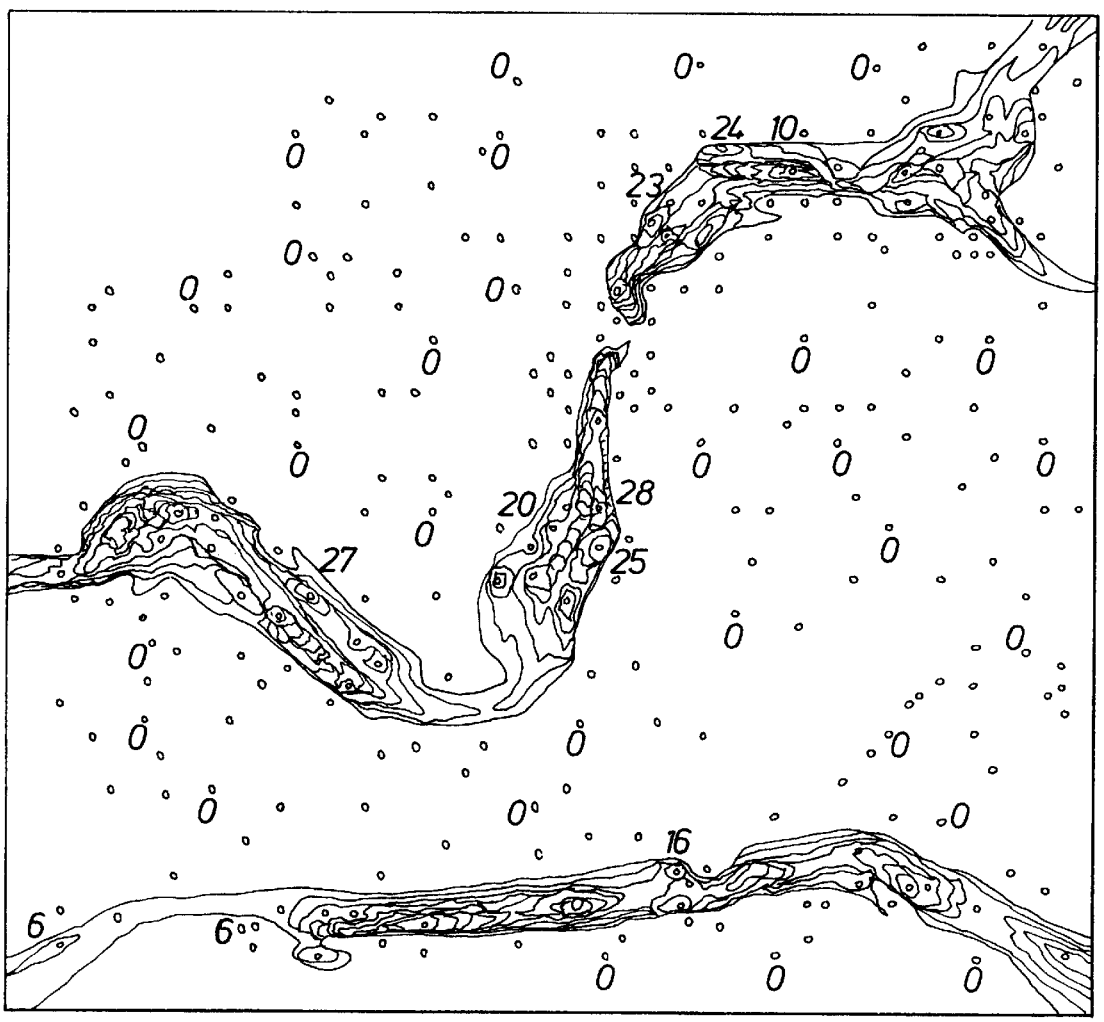
FIG. 9 illustrates stream channel contours generated to conform to the distance contours in FIG. 8.

Using a standard commercial mapping package a grid may be created which models the distance from the three polylines. Contours of this grid are shown in FIG. 8. The contour lines parallel the polylines, while proper connection of the positive thickness values in the data should run along the digitized polylines or parallel to the contours in FIG. 8. The grid from which FIG. 8 contours are generated may be used, for example, as the form grid to use in gridding the data in FIG. 7. Before gridding, the data points with 0 thickness are assigned a negative value. This a common practice in computer contouring of thickness data to force the 0 contour level to lie between wells where thickness was recorded and wells where it was missing. A value of −20 was substituted for the 0 values. The resulting contours are shown in FIG. 9.

Distance gridding, whether done in a commercial mapping package or by a distance transformation, appears to be the most natural way to quickly generate form grids, assuming such a grid is not already available. The first step is to contour the available data without use of a form grid. The resulting contours can be compared with the data at a terminal or on hardcopy to determine where local biases are needed. Next the interpreter digitizes on screen one or more polylines showing the directions of local bias. Once the polylines are available they are used to create a distance grid. That distance grid becomes the source of the form grid. If necessary, the z-values in the form grid can be clipped to a maximum value. Then the clipped part of the form grid will have no slope and gridding in those parts of the form grid will be ordinary moving weighted averaging.

C. Performance

As mentioned above, distance transformations imply a computational complexity of O(m*k) where m is the number of grid nodes, and k is the number of data values. Therefore the cost measured in computer time of using the method of the invention increases as the size of the output grid increases, and as the number of data points increases. The grid contour of FIG. 6, which has 121 rows and 121 columns, was generated in 174 CPU seconds from 36 data values on a Sparc20. The grid contoured in FIG. 9, which has only 77 rows and 85 columns, was generated in 709 CPU seconds form 309 data values on a Sparc20.

The first grid has 14641 nodes, the second grid has 6545 nodes. The ratio of grid nodes times the number of data points for the two tests is, in fact, very close to the ratio of the two CPU times recorded:

$$\frac{6545 \times 309}{14641 \times 36} = 3.8 \approx 4.1 = \frac{709}{174}.$$

That computation time increases rapidly as the size of the problem increases is disturbing, but it is impossible to avoid such computation time when using distance transformations on a standard workstation. The complexity of any sequential distance transformation is inherently proportional to the size of the underlying grid.

One conclusion to draw from an analysis of the computational complexity of the invention is that it is not an appropriate tool at the present state of work station configuring power to add geologic interpretation to a data set made up of 100,000 seismic shot points. On the other hand, data sets for which added interpretation are required usually do not have 100,000 shot points. Instead they have scores, or at most a few hundred wells. In these cases the human time saving is likely to be large, and to be well worth the computer time.

Various modifications and alterations in the described methods of manufacture and apparatus will be apparent to those skilled in the art of the foregoing description which does not depart from the spirit of the invention. For this reason, such changes are desired to be included within the scope of the appended claims. The appended claims recite the only limitations to a definition of the present invention. The descriptive manner which is employed for setting forth the embodiments should be interpreted as illustrative but not limitative.

What is claimed is:

1. A method for imposing an interpretation onto a rectangular grid-based model of a three dimensional object comprising the steps of,
   providing a rectangular form grid having contours representative of the general shape of a model of said object, said grid having nodes,
   defining at each of said nodes of said form grid a local gradient,
   defining geologic data samples on said form grid which are representative of said object,
   determining a total distance measurement between each geologic data sample and each grid node of said form grid, where each said total distance measurement is measured along a minimum weighted length path defined by connecting adjacent nodes of said form grid, where said minimum weighted length path between any adjacent pair of grid nodes is increased to define an increased minimum weighted length path by,
      the absolute value of the cosine of the angle of a ray joining said adjacent pair of grid nodes and a local gradient of said form grid,
      a magnitude of said local gradient, and
      a predetermined non-negative real number,
   determining an object value at each node of said grid by weighting each data sample in inverse proportion to said increased minimum weighted length between each data sample and said grid node, and
   plotting said object value for each node on an x-y map.

2. The method of claim 1 wherein
   said step of determining an object value at each node includes steps of moving weighted averaging and moving least squares surface fitting.

3. A method for imposing a geologic interpretation onto a contour map comprising the steps of:
   providing a form grid of terrain pixels representative of the topography of a geologic formation with first derivatives $d\bar{z}/dx$ and $d\bar{z}/dy$ defined at each terrian pixel;
   determining the magnitude of the gradient ($|\text{grad}|i,j$) at each of said terrian pixel,
   determining the cosine (cosine(i,j)) of the angle between the normalized dot product of the vectors $d\bar{z}/dy$ with offset vectors $\bar{i}, \bar{j}$ at each terrian pixel for each neighboring pixel,
   defining feature pixels on said form grid where said feature pixels represent a characteristic of said geologic formation,
   defining an approximation of the distance from d(i,j) to d(0,0), C*(i,j), in a distance transformation of each of said feature pixels to said form grid
   as a function of a penalty factor and said cosine(i,j) and said $|\text{grad}|i,j$
   where penalty is a non-negative number representative of the maximum cost for movements along dip in said form grid, and
   plotting said feature pixels which have been distance transformed on a contour map.

4. The method of claim 3 wherein
   said feature pixels represent water saturation of said geologic formation.

5. A method for imposing a geologic interpretation onto a contour map comprising the steps of:
   providing a three dimensional form grid of terrain pixels representative of the topography of a geologic formation with first derivatives $d\bar{z}/d\bar{x}$ and $d\bar{z}/d\bar{y}$ defined at each terrian pixel;
   determining the magnitude of the gradient at each of said terrian pixel, as $$|\text{grad}|_{ij} = \sqrt{\left(\frac{dz^2}{dx}\right) + \left(\frac{dz^2}{dy}\right)},$$

determining the cosine of the angle between the normalized dot product of the vectors $d\bar{z}/dy$ with offset vectors $\bar{i}, \bar{j}$ at each terrian pixel for each neighboring pixel as $$\text{cosine }(i,j) = \frac{\frac{d\bar{z} \cdot \bar{i}}{dx} + \frac{d\bar{z} \cdot \bar{j}}{dy}}{(|\text{grad}|)(\sqrt{i^2 + j^2})}$$

defining feature pixels on said form grid where said feature pixels represent a characteristic of said geologic formation, defining an approximation of the distance from $d(i,j)$ to $d(o,o)$, $C^*(i,j)$, in a distance transformation of each of said feature pixels to said form grid where $C^*(i,j) = C(i,j) [1+(\text{penalty})(|\text{cosine}|(i,j)) (|\text{grad}|i,j)]$ where penalty is a non-negative number representative of the maximum cost for movements along dip in said form grid, and where distance transformation means five pixel forward and backward masks and $C(-1,0) = C(1,0) = C0,1) = C = (0,-1) = 0.95509$, and $C(1,1) = C(-1,-1) = C(1,-1) = C(-1,1) = 1.36930$, and plotting said feature pixels which have been distance transformed on a contour map.

\* \* \* \* \*